US012621726B2

(12) United States Patent
Lu

(10) Patent No.: US 12,621,726 B2
(45) Date of Patent: May 5, 2026

(54) RELAY SERVICE BASED COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 520 days.

(21) Appl. No.: 18/147,349

(22) Filed: Dec. 28, 2022

(65) Prior Publication Data
US 2023/0189087 A1 Jun. 15, 2023

Related U.S. Application Data

(63) Continuation of application No. PCT/CN2020/119733, filed on Sep. 30, 2020.

(51) Int. Cl.
*H04W 36/00* (2009.01)
*H04W 88/04* (2009.01)

(52) U.S. Cl.
CPC ....... *H04W 36/0061* (2013.01); *H04W 36/03* (2018.08); *H04W 88/04* (2013.01)

(58) Field of Classification Search
None
See application file for complete search history.

(56) References Cited

U.S. PATENT DOCUMENTS

| | | | |
|---|---|---|---|
| 11,290,932 B2 * | 3/2022 | Jin | ................... H04W 36/0079 |
| 2016/0212682 A1 | 7/2016 | Chung et al. | |
| 2018/0167986 A1 | 6/2018 | Lin et al. | |
| 2019/0320357 A1 | 10/2019 | Wang et al. | |
| 2020/0015134 A1 | 1/2020 | Yang | |
| 2020/0068624 A1 | 2/2020 | Xu et al. | |

FOREIGN PATENT DOCUMENTS

| | | |
|---|---|---|
| CN | 105657643 | 6/2016 |
| CN | 106686674 | 5/2017 |
| CN | 108684218 | 10/2018 |
| CN | 108924962 | 11/2018 |

(Continued)

OTHER PUBLICATIONS

Lenovo et al., "Handover of eRelay-UE with eRemote-UE(s) having an active indirect connection," SA WG2 Meeting #122, S2-1744969 (revision of S2-174370), Jun. 2017.

(Continued)

*Primary Examiner* — Gerald A Smarth
(74) *Attorney, Agent, or Firm* — Hodgson Russ LLP

(57) ABSTRACT

The communication method includes the following. A first terminal device receives first information from a first network device, where the first information indicates that the first terminal device is to hand over to a second network device. The first terminal device transmits second information to a second terminal device, where the second information indicates that the second terminal device is to hand over to the second network device, and the first terminal device provides relay service to the second terminal device.

16 Claims, 6 Drawing Sheets

(56) References Cited

FOREIGN PATENT DOCUMENTS

| | | | | |
|---|---|---|---|---|
| CN | 109691172 | | 4/2019 | |
| CN | 111107596 | | 5/2020 | |
| CN | 111182591 | | 5/2020 | |
| CN | 111432469 | | 7/2020 | |
| CN | 111586765 | | 8/2020 | |
| EP | 3179822 | | 6/2017 | |
| EP | 3589065 B1 | * | 2/2022 | ........ H04W 36/0064 |
| JP | 2020010276 | | 1/2020 | |
| WO | 2018082644 | | 5/2018 | |
| WO | WO-2019028811 A1 | * | 2/2019 | ............ H04W 76/30 |
| WO | 2020173415 | | 9/2020 | |

OTHER PUBLICATIONS

EPO, Extended European Search Report for EP Application No. 20955827.9, Oct. 20, 2023.

LG Electronics Inc., "Relay selection and reselection," 3GPP TSG-RAN WG2 #92, R2-156492, Nov. 2015.

WIPO, International Search Report and Written Opinion for International Application No. PCT/CN2020/119733, Jun. 29, 2021.

ZTE, "Service continuity for ProSe UE-to-network relay," 3GPP TSG RAN WG2 #90, R2-152546, May 2015.

CNIPA, First Office Action for CN Application No. 202080103640.9, Apr. 11, 2024.

CNIPA, Second Office Action for CN Application No. 202080103640.9, Aug. 17, 2024.

CNIPA, Rejection Decision for CN Application No. 202080103640.9, Oct. 17, 2024.

EPO, Extended European Search Report for EP Application No. 24213737.0, Feb. 24, 2025.

* cited by examiner

700

RELAY SERVICE BASED COMMUNICATION METHOD AND TERMINAL DEVICE

CROSS-REFERENCE TO RELATED APPLICATION(S)

This application is a continuation of International Application No. PCT/CN2020/119733, filed Sep. 30, 2020, the entire disclosure of which is incorporated herein by reference.

TECHNICAL FIELD

Implementations of this disclosure relate to communication technology, and particularly to a communication method and a terminal device.

BACKGROUND

In the field of communication, besides communication through a cellular communication interface, i.e. user equipment (UE)-universal mobile telecommunication system (UMTS) terrestrial radio access network (UE-UTRAN, Uu) interface, UEs can also directly communicate with each other through a direct-connection communication interface, i.e. proximity-based service (ProSe) communication (interface) 5 (PC5 interface), where the PC5 interface can be used for information transmission of a data plane and a control plane, etc. For example, in device-to-device (D2D) communication, UEs can directly communicate with each other, and can share spectrum resources with a cell terminal under control of a cell network, which can efficiently improve spectrum resource utilization.

If the UE is outside a network coverage, or a communication quality between the UE and a radio access network (RAN) is low, an indirect communication mode, i.e. relay communication with aid of a communication architecture of PC5 interface and Uu interface, can be used. Specifically, data of the UE (referred to as a remote UE) can be transferred to a relay UE through a PC5 interface, and then the relay UE transmits the data of the remote UE to a network through a Uu interface between the relay UE and a network device. At present, there is still absence of a mobility management solution regarding the case where a UE providing relay service moves, for example, how to handle a communication connection between the relay UE and the remote UE when the relay UE needs to hand over from the connected network device due to movement.

SUMMARY

In a first aspect, a communication method is provided in implementations of the disclosure. The method includes the following. The first terminal device receives first information from a first network device, where the first information indicates that the first terminal device is to hand over to a second network device. The first terminal device transmits second information to a second terminal device, where the second information indicates that the second terminal device is to hand over to the second network device, and the first terminal device provides relay service to the second terminal device.

In a second aspect, a communication method is provided in implementations of the disclosure. The method includes the following. The second terminal device receives second information from a first terminal device, where the second information indicates that the second terminal device is to hand over to a second network device, and the first terminal device provides relay service to the second terminal device.

In a third aspect, a terminal device is further provided in implementations of the disclosure. The terminal device includes a processor, a memory, and a transceiver. The memory is configured to store computer-executable instructions. The processor is configured to execute the computer-executable instructions stored in the memory, to: cause the transceiver to receive first information from a first network device, the first information indicating that a first terminal device is to hand over to a second network device; determine, according to the first information, to hand over to the second network device; cause the transceiver to transmit second information to a second terminal device, the second information indicating that the second terminal device is to hand over to the second network device, and the first terminal device providing relay service to the second terminal device.

DETAILED DESCRIPTION

Figure 1:
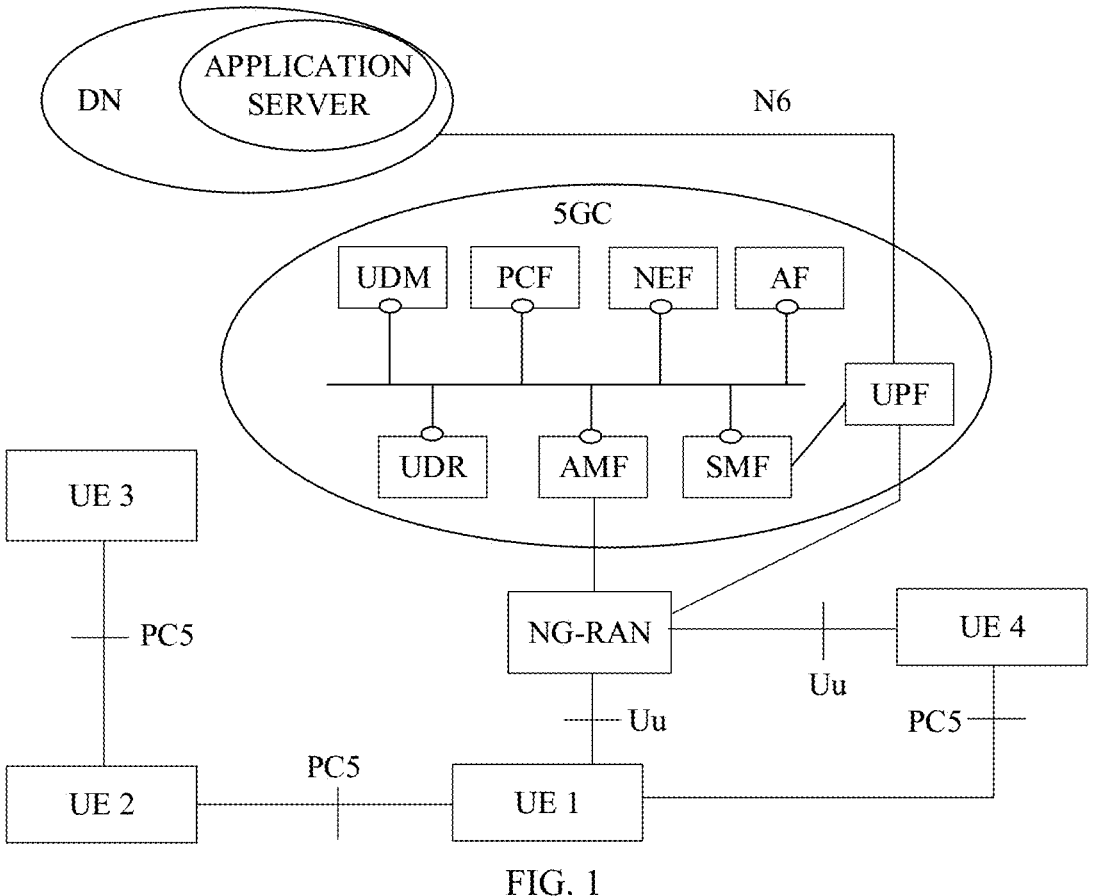
FIG. 1 is a schematic architectural diagram of a communication system to which the disclosure is applicable.

Technical solutions of the disclosure will be elaborated below with reference to the accompanying drawings. Implementations of the disclosure provide a communication method and a communication apparatus, which can improve resource utilization and reduce power consumption of a terminal device.

Technical solutions of implementations of the disclosure are applicable to various communication systems, for example, a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) communication system, or new radio (NR), etc.

A terminal in implementations of the disclosure may refer to as a user equipment (UE), an access terminal, a subscriber unit, a subscriber station, a mobile station, a remote station, a remote terminal, a mobile device, a user terminal, a terminal device, a wireless communication device, a user agent, or a user device. The terminal device may also be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, or a terminal device in a future evolved public land mobile network (PLMN), etc. Implementations of the disclosure are not limited in this regard.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In addition, in implementations of the disclosure, the terminal device may be a terminal device in an internet of things (IoT) system. IoT is an important part in future development of information technology. IoT is typically characterized by connection of objects to a network through communication technology, thereby realizing an intelligentized network of human-machine interconnection and thing-thing interconnection.

The network device in implementations of the disclosure may be a device configured to communicate with a terminal device. The network device may be a base transceiver station (BTS) in a GSM or CDMA system, may be a Node B (NB) in a WCDMA system, may be an evolutional Node B (eNB or eNodeB) in an LTE system, or may be a radio controller in a cloud radio access network (CRAN) scenario. Or the network device may be a relay station, an access point (AP), or an in-vehicle device, a network device in a 5G network, or a network device in a future evolved PLMN, etc. Implementations of the disclosure are not limited in this regard.

In implementations of the disclosure, a proximity-based service (ProSe) communication (interface) 5 (PC5 interface) can be a reference point between two UEs, and can be used for signaling transmission of a control plane and data transmission of a user plane, ProSe discovery, direct communication, etc. The PC5 interface can be used for short-distance direct communication or direct-connection communication between UEs, which may be referred to as "PC5 communication" or "PC5 interface communication" for short. A UE that communicates through a PC5 interface may be within a network coverage, or may be outside a network coverage. The network may be a 4th generation (4G) network, or may be a 5G network. Implementations of the disclosure are not limited in this regard.

In implementations of the disclosure, a UE-UMTS terrestrial radio access network (UE-UTRAN, Uu) interface may be an interface between a UE and an access-network device. The access-network device may be a base station in a UMTS, an evolutional node B (eNodeB or eNB) in a 4G network, a next-generation node base station (gNodeB or gNB) in a 5G network, or a base station in a future evolved network, which is not limited herein. When two or more UEs communicate with each other via an access-network node, the communication can be referred to as "Uu communication" or "Uu interface communication" for short.

FIG. 1 is a schematic diagram of a system architecture. As illustrated in FIG. 1, the system architecture may include the following network elements.

1. Terminal, such as UE 1~UE 4 in FIG. 1.

2. Radio access network (RAN) node: A module, apparatus, or device, etc. implementing access-network functions based on wireless communication technology may be referred to as an RAN node. The RAN node is mainly used to provide an interface for a UE to access a mobile network wirelessly, and is capable of radio resource management and providing access service for the UE, thereby forwarding control signals and user data between the UE and a core network. For example, the RAN node may be a base station, etc. A RAN used in a 5G system is a next generation RAN (NG-RAN), and a RAN node in the 5G system is gNB.

3. Access and mobility management function (AMF): mainly used for mobility management and access management, etc. Specifically, the AMF can be used for implementing functions of a mobility management entity (MME) other than session management, such as lawful monitoring, or access authorization (or authentication), etc. A module, apparatus, or device, etc. capable of implementing the AMF can be referred to as an AMF node.

4. Session management function (SMF): mainly used for session management, UE internet protocol (IP) address allocation and management, selection and management of user plane functions (UPF), policy control, acting as an endpoint of a charging function interface, downlink data notification, configuration of routing information for a UPF, etc. A module, apparatus, or device, etc. capable of implementing the SMF may be referred to as an SMF node.

5. Policy control function (PCF): a unified policy framework to govern network behavior. The PCF can provide policy rule information for a control plane function (such as AMF, SMF, etc.). A module, apparatus, or device capable of implementing the PCF may be referred to as a PCF node.

6. Unified data management (UDM): used for user identification handling, access authentication, registration, or mobility management, etc.

7. UPF: used for packet routing and forwarding, or quality of service (QoS) handling for user plane data, etc. The UPF includes an intermediate-UPF (I-UPF) and an anchor-UPF (A-UPF). The I-UPF is connected with the RAN. The A-UPF is a session anchor UPF, and may also be referred to as a protocol data unit (PDU) session anchor (PSA). A module, apparatus, or device capable of implementing the UPF can be referred to as a UPF node.

8. Application function (AF): mainly supports interaction with a 3rd generation partnership project (3GPP) core network to provide services, for example, influence on traffic routing, PCF, or providing some third-party services to a network side. The AF may be considered as a third-party server, for example, an application server in an Internet. The AF can provide related service information, which includes providing QoS requirement information corresponding to a service for a PCF and transmitting user plane data information of the service to a PSA-UPF. The AF may also be a content provider (CP), for example, a ProSe application server is an AF.

9. Network exposure function (NEF): connects a core network and an external application server, and provides services such as authentication and data forwarding when the external application server initiates a service request to the core network.

10. Data network (DN): a network used for data transmission, for example, Internet, etc.

11. Unified data repository (UDR): used to provide storage and retrieval for a PCF policy, storage and retrieval of structured data for exposure, and storage of AF request information for users, etc.

The UE (such as UE 1 and UE 4) accesses a network through an air interface and is served by the network. The UE interacts with the RAN node through the air interface, and interacts with the AMF node through a non-access stratum (NAS) message. The UPF node is responsible for forwarding and receiving user data of the terminal. A transmission resource used for serving the terminal and a scheduling function of the UPF node are managed and controlled by the SMF node. The AMF node is mainly responsible for signaling handling, such as access control, mobility management, attachment and detachment, gateway selection, etc. In addition, when providing service to a session of the terminal, the AMF node can provide a control-plane storage resource to the session, to store a session identity (ID), an SMF ID associated with a session ID, etc. The SMF node is responsible for user plane node selection, user plane node redirection, IP address allocation, bearer establishment, bearer modification, bearer release, and QoS control. A remote terminal (such as UE 2 in FIG. 1) can be assisted by a relay terminal. For example, in FIG. 1, UE 2 can be assisted by UE 1. Communication between the remote terminal and the RAN node is realized through communication between the remote terminal and the relay terminal and communication between the relay terminal and the RAN node.

It is to be noted that, the network device in the disclosure (for example, a first network device and a second network device) may be the RAN node illustrated in FIG. 1.

It is to be noted that, the terms "first", "second", and the like used in the specification, the claims, and the accompany drawings of implementations of the disclosure are used to distinguish similar objects rather than describe a particular order or sequence. It should be understood that, the terms thus used are interchangeable in appropriate cases, such that implementations of the disclosure described herein can be implemented in sequences other than those illustrated or described herein. In addition, the terms "include", "comprise", and "have" as well as variations thereof are intended to cover non-exclusive inclusion. For example, a process, method, system, product, or device including a series of steps or units is not limited to the listed steps or units. Instead, it can optionally include other steps or units that are not listed, or may also include other steps or units inherent to the process, method, product, or device.

In order to make purposes, technical solutions, and advantages of implementations of the disclosure clearer, technical solutions of implementations of the disclosure will be described clearly and completely below with reference to the accompanying drawings in the implementations of the disclosure. Apparently, implementations described herein are some implementations, rather than all implementations, of the disclosure. Based on the implementations of the disclosure, all other implementations obtained by those of ordinary skill in the art without creative effort shall fall within the protection scope of the disclosure.

For a case where a relay terminal device that is providing relay service to the remote terminal device needs to hand over from a network device that is providing service, there is currently no solution regarding how to handle a communication connection between a relay UE and a remote UE. If the connection is directly disconnected, the remote terminal device will search for another device capable of providing service. The relay terminal is likely to hand over due to poor communication quality between the relay terminal and a current serving cell, but a communication quality between the relay terminal and the remote terminal may be still good, and the relay terminal may be still able to provide relay service to the remote terminal after the relay terminal hands over to another network device. Therefore, in the disclosure, when the relay terminal performs serving-cell handover, the relay terminal can notify the remote terminal device to hand over to the same target network device as the relay terminal. As such, it is possible to prevent the remote terminal device from searching for another device capable of providing service due to handover of the relay terminal device, which can improve resource utilization and reduce power consumption of a terminal device.

Figure 2:
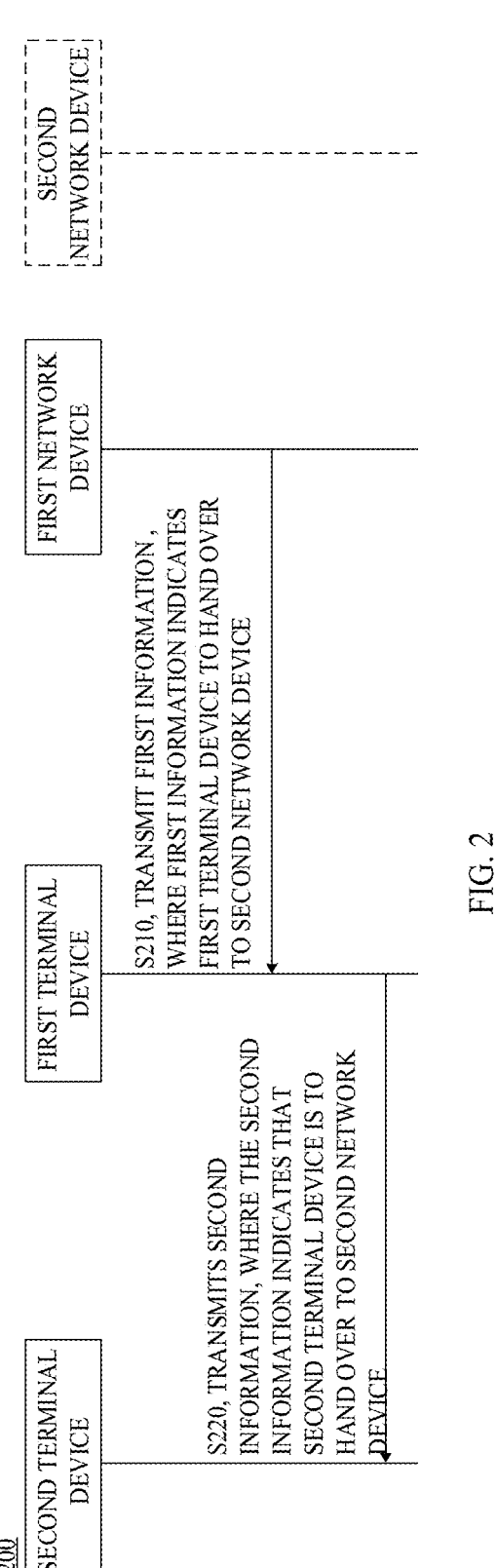
FIG. 2 is a schematic flowchart of a communication method provided in implementations of the disclosure.

FIG. 2 is a schematic flowchart of a communication method 200 provided in implementations of the disclosure. The method may be implemented by a first terminal device or a module (such as a chip) configured (or used) in the first terminal device.

In implementations illustrated in FIG. 2, a direct-connection communication (or sidelink communication) is established between a first terminal device and a second terminal device, and the first terminal device provides relay service to the second terminal device. In other words, the first terminal device can act as a relay terminal device (relay UE) to provide relay service to the second terminal device acting as a remote terminal device (remote UE). Data of the second terminal device can be transferred to the first terminal device through a PC5 interface, and then the first terminal device transmits the data of the remote terminal device to a network through a Uu interface between the first terminal device and a first network device.

S210, the first network device transmits first information to the first terminal device, where the first information indicates that the first terminal device is to hand over to a second network device.

Accordingly, the first terminal device receives the first information from the first network device.

By way of example rather than limitation, the first information is carried in a first handover message (or referred to as a first handover command) transmitted to the first terminal device by the first network device. For example, if a handover condition is satisfied by the first terminal device, the first network device transmits the first handover message to the first terminal device. For instance, if a communication quality between the first terminal device and the first network device degrades, and a cell signal quality of the second network device measured and reported by the first terminal device satisfies a handover condition of the first terminal device, the first network device determines that the first terminal device hands over to the second network device, and transmits the first handover message to the first terminal device. Optionally, the first information may include an ID of the second network device, and the first handover message may contain related configuration information for accessing the second network device, etc. The disclosure is not limited in this regard.

Optionally, the first information may indicate handover explicitly or implicitly.

For example, the first information directly indicates or instructs the first terminal device to hand over to the second network device, and the first terminal device performs handover upon reception of the first information. Or the first information may implicitly indicate handover as follows. The first information includes a handover condition for handover to the second network device, and the first terminal device hands over to the second network device if the handover condition is satisfied. The disclosure is not limited in this regard.

It is to be noted that, in the disclosure, handover of the first terminal device to the second network device may mean that the first terminal device hands over to a cell managed by the second network device, and takes the cell managed by the second network device as a serving cell for the first terminal device.

S220, the first terminal device transmits second information to the second terminal device, where the second information indicates that the second terminal device is to hand over to the second network device.

Accordingly, the second terminal device receives the second information from the first terminal device.

In an implementation, the first network device transmits the second information to the first terminal device, and the first terminal device forwards the second information to the second terminal device.

In other words, the second information is relayed to the second terminal device by the first terminal device from the first network device, and whether to indicate (in other words, instruct) the second terminal device to hand over to the second network device is determined by the first network device.

For example, the first network device may determine, according to location information of the first terminal device and the second terminal device or a present communication quality between the first terminal device and the second terminal device, that the first terminal device is still able to serve the second terminal device regardless of handover of the first terminal device to the second network device. Then the first network device transmits the second information to the first terminal device, such that the first terminal device forwards the second information to the second terminal device to notify the second terminal device to hand over to the second network device via the first terminal device. In other words, the second terminal device may obtain network service of the second network device via the first terminal device. Or the first network device may also transmit the second information to the second terminal device based on other conditions. The disclosure is not limited in this regard.

Optionally, the second information is carried in a second handover message transmitted to the first terminal device from the first network device, and the first terminal device forwards the second handover message to the second terminal device. Or the second information is carried in the first handover message. Once the first handover message is received by the first terminal device, the first terminal device forwards to the second terminal device the second information that is to be transmitted to the second terminal device.

In another implementation, the first terminal device determines, according to the first information, to transmit the second information to the second terminal device.

In other words, whether to indicate the second terminal device to hand over to the second network device is determined by the first terminal device. If the first terminal device determines to indicate the second terminal device to hand over to the second network device, the first terminal device generates the second information and transmits the second information to the second terminal device.

For example, after the first information is received by the first terminal device, the first terminal device determines to hand over to the second network device, but the first terminal device is currently providing relay service to the second terminal device. The first terminal device determines, according to the communication quality between the first terminal device and the second terminal device, that the first terminal device is still able to provide relay service to the second terminal device after handover to the second network device. For instance, the communication quality between the first terminal device and the second terminal device is still good enough even though the communication quality between the first terminal device and the first network device degrades due to movement. In this case, the first terminal device can transmit the second information to the second terminal device, to notify the second terminal device to hand over to the second network device. In other words, the second terminal device can obtain network service of the second network device via the first terminal device. Or the first terminal device may also determine, according to location information of the second terminal device, relative location information between the first terminal device and the second terminal device, or other information, whether to transmit the second information to the second terminal device. The disclosure is not limited in this regard.

Optionally, the second information specifically indicates that the second terminal device is to hand over to the second network device via the first terminal device.

According to the above scheme, in case of handover of a relay terminal device, the relay terminal device can notify, according to some condition, a remote terminal device to hand over from a network device currently providing service, such that the relay terminal can continue providing relay service to the remote device. As such, it is possible to prevent the remote terminal device from searching for another device capable of providing service due to handover of the relay terminal device, thereby reducing power consumption of the remote terminal device and avoiding unnecessary waste of resources.

Since the first terminal device needs to hand over to the second network device from the first network device, it is likely that some resources (such as some user plane (UP) resources) configured by the first network device for the first terminal device and the second terminal device cannot continue to be used. After the second information is received by the second terminal device, how to hand over to the second network device via the first terminal device may include, but is not limited to, the following two manners.

The two manners will be elaborated below with reference to FIG. 3 and FIG. 4.

Manner 1

The first terminal device and the second terminal device reestablish a connection after a previous connection is disconnected, thereby realizing resource configuration of the second network device through connection re-establishment.

In an implementation, it may be specified in a protocol that the relay terminal device (that is, the first terminal device) disconnects a communication connection with the remote terminal device (that is, the second terminal device) upon reception of the first information. Or it may be specified in a protocol that the remote terminal device disconnects a communication connection with the relay terminal device upon reception of the second information.

In another implementation, the first information further indicates that the first terminal device disconnects a communication connection with the second terminal device, or the second information further indicates that the second terminal device disconnects a communication connection with the first terminal device.

Figure 3:
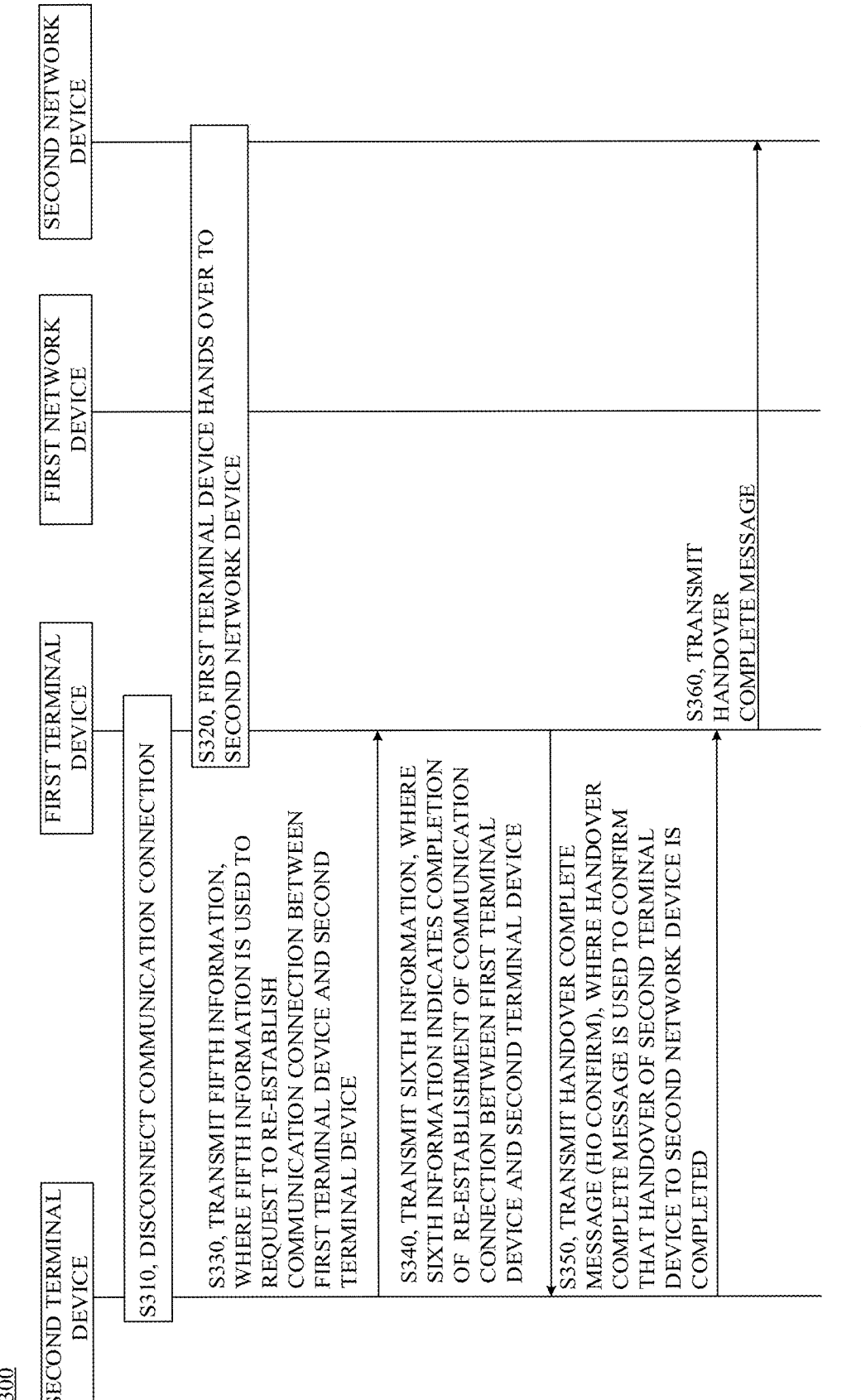
FIG. 3 is another schematic flowchart of a communication method provided in implementations of the disclosure.

FIG. 3 is a schematic flowchart of another communication method 300 provided in implementations of the disclosure.

S310, the first terminal device and the second terminal device disconnect a communication connection.

The communication connection may be a direct-connection communication connection, such as a PC5 interface connection, between the first terminal device and the second terminal device.

Optionally, "the first terminal device and the second terminal device disconnect the communication connection" may mean releasing some communication resources such as physical-layer-data communication resources, or reserving some resources.

For example, the first terminal device may not release related information of the second terminal device, and does not need to re-obtain the related information after a connection is re-established. The second terminal device can save related information of the first terminal device and related information of connection re-establishment, such as related information of synchronization signals or access resources, etc., such that the second terminal device can request connection re-establishment in S320 according to the related information stored, which is possible to avoid resource waste and improve efficiency in connection re-establishment.

In an implementation, after the second information is transmitted by the first terminal device and/or the second information is received by the second terminal device, the communication connection between the first terminal device and the second terminal device will be disconnected.

For example, the first terminal device disconnects the communication connection with the second terminal device after transmitting the second information, for example, stops detecting data information from the second terminal device, stops providing data relay service to the second terminal device, etc. The second terminal device disconnects the communication connection with the first terminal device after receiving the second information, for example, stops transmitting data information to the first terminal device, etc. The disclosure is not limited in this regard.

In another implementation, the first terminal device transmits third information to the second terminal device, where the third information indicates that the communication connection between the first terminal device and the second terminal device is to be disconnected.

For example, the first terminal device transmits the third information to the second terminal device once the first terminal device determines that handover begins, but the disclosure is not limited thereto.

In another implementation, the second terminal device transmits fourth information to the first terminal device, where the fourth information indicates that the communication connection between the first terminal device and the second terminal device is to be disconnected.

By way of example rather than limitation, the third information and/or the fourth information is PC5 signaling (PC5-S) or PC5 radio resource control (RRC) signaling.

According to the above scheme, with aid of the third information or the fourth information, the first terminal device and the second terminal device can reach an agreement regarding disconnecting the communication connection between the first terminal device and the second terminal device, which is possible to avoid resource waste.

S320, the first terminal device hands over to the second network device.

The first terminal device hands over to the second network device from the first network device. In other words, the first network device acts as a source network device for the first terminal device, and the first terminal device hands over from the first network device to the second network device acting as a target network device.

For example, the first terminal device initiates a random access procedure to access the second network device, for instance, transmits a random access preamble sequence on a random access channel (RACH) of the second network device to access the second network device. Once the second network device has notified corresponding network configuration to the first terminal device through an RRC message, the first terminal device transmits a handover confirmation (HO-confirm) message to the second network device, thereby completing handover of the first terminal device to the second network device. The disclosure is not limited in this regard.

S330, the second terminal device transmits fifth information to the first terminal device, where the fifth information is used to request to re-establish a communication connection between the first terminal device and the second terminal device.

Accordingly, the first terminal device receives the fifth information from the second terminal device. In other words, the fifth information is used to establish a PC5 connection between the first terminal device and the second terminal device.

By way of example rather than limitation, the fifth information is PC5-S or PC5 RRC signaling. Optionally, the fifth information is carried in a connection re-establishment request (re-connect request) message. It is to be noted that, there is no limitation on the execution order between S330 and S320 in the disclosure. In specific scenarios, S330 may be performed before S320, or may be performed after S320.

S340, the first terminal device transmits sixth information to the second terminal device, where the sixth information indicates re-establishment complete of the communication connection between the first terminal device and the second terminal device.

Accordingly, the second terminal device receives the sixth information from the first terminal device. On condition that the fifth information which is transmitted by the second terminal device and used to request connection re-establishment is received by the first terminal device, once handover of the first terminal device to the second network device is completed, the first terminal device can interact with the second network device to complete related configuration for the first terminal device to provide relay service to the second terminal device, and transmit the sixth information to the second terminal device to notify the second terminal device that re-establishment of the communication connection is completed. Once the sixth information is received by the second terminal device, the second terminal device can determine that the second terminal device can continue communicating with a network through relay service provided by the first terminal device.

By way of example rather than limitation, the sixth information is carried in a connection re-establishment acknowledgement (ACK) (re-connect ACK) message.

Optionally, the first terminal device further transmits to the second terminal device related configuration information after connection re-establishment.

The second terminal device communicates with the first terminal device according to the configuration information after receiving the configuration information.

Optionally, if the sixth information is received by the second terminal device within a first time-interval after the second information is received, the second terminal device determines that handover to the second network device succeeds. Or if the sixth information is not received by the second terminal device within the first time-interval after the second information is received, the second terminal device determines that handover to the second network device fails. Optionally, the first time-interval may be specified in a protocol or configured by a network.

Optionally, the second terminal device starts a first timer (or may be other devices capable of timing such as a counter, a timer, etc.) upon reception of the second information, where a duration of the first timer is the first time-interval.

If the sixth information is received by the second terminal device before the first timer expires, the second terminal device determines that handover to the second network device succeeds, and stops the first timer. Or if the first timer expires, the second terminal device determines that handover to the second network device fails, that is, the second terminal device determines that handover to the second network device fails if the sixth information is not received before the first timer expires.

Once the second terminal device determines that handover to the second network device fails, the second terminal device can trigger again a connection re-establishment procedure, for example, transmit again a connection re-establishment message to the first terminal device. Or the second terminal device can search, through a cell search procedure, for a cell capable of serving the second terminal device, and access a network through a random access procedure. Or the second terminal device can search for another terminal device capable of providing relay communication service, and establish a sidelink connection with the terminal device to communicate with a network via the terminal device. The disclosure is not limited in this regard.

According to the scheme above, a period in which second terminal device hands over to the second network device via the first terminal device is restricted by the first time-interval, which can avoid a case where the second terminal device is unable to communicate due to failure of handover to the second network device via the first terminal device for a long time.

Optionally, S350, the second terminal device transmits a handover complete message (HO confirm) to the first terminal device, where the handover complete message is used to confirm that handover of the second terminal device to the second network device is completed.

Accordingly, the first terminal device receives the handover complete message of the second terminal device.

After the connection with the first terminal device is re-established, the second terminal device can notify, via the first terminal device, the second network device that handover is completed, such that the second terminal device and the second network device can reach an agreement, thereby performing subsequent communication.

Optionally, S360, the first terminal device transmits the handover complete message to the second network device.

Accordingly, the second network device receives the handover complete message from the first terminal device.

For example, after the handover complete message from the second terminal device is received by the first terminal device in S350, the first terminal device forwards the handover complete message to the second network device, such that the second terminal device and the second network device can reach an agreement in order for subsequent communication. Or the second terminal device transmits ACK information after the sixth information is received from the first terminal device. The first terminal device can determine, according to the ACK information, that handover of the second terminal device to the second network device is completed, and notify the second network device through the handover complete message. The disclosure is not limited in this regard.

Manner 2

The first terminal device and the second terminal device perform radio link control (RLC) re-establishment and/or media access control (MAC) reconfiguration, thereby realizing resource configuration of the second network device through RLC re-establishment and/or MAC reconfiguration.

For example, a network side reserves a control plane resource for the second terminal device. After handover of the first terminal device to the second network device is completed, the network re-configures a user plane resource for the second terminal device. The first terminal device and the second terminal device perform RLC re-establishment and/or MAC reconfiguration using the re-configured user plane resource. The disclosure is not limited in this regard.

According to the scheme above, after handover of the first terminal device to the second network device is completed, the first terminal device re-establishes a direct-connection communication connection with the second terminal device according to the configuration of the second network device, thereby realizing handover of the second terminal device to the second network device via the first terminal device. As such, in case of handover of a relay terminal device, a remote terminal device can hand over to the same network device via the relay terminal device, which is possible to prevent the remote terminal device from searching for another device capable of providing service due to handover of the relay terminal device, thereby reducing power consumption of the remote terminal device and avoiding unnecessary resource waste.

Figure 4:
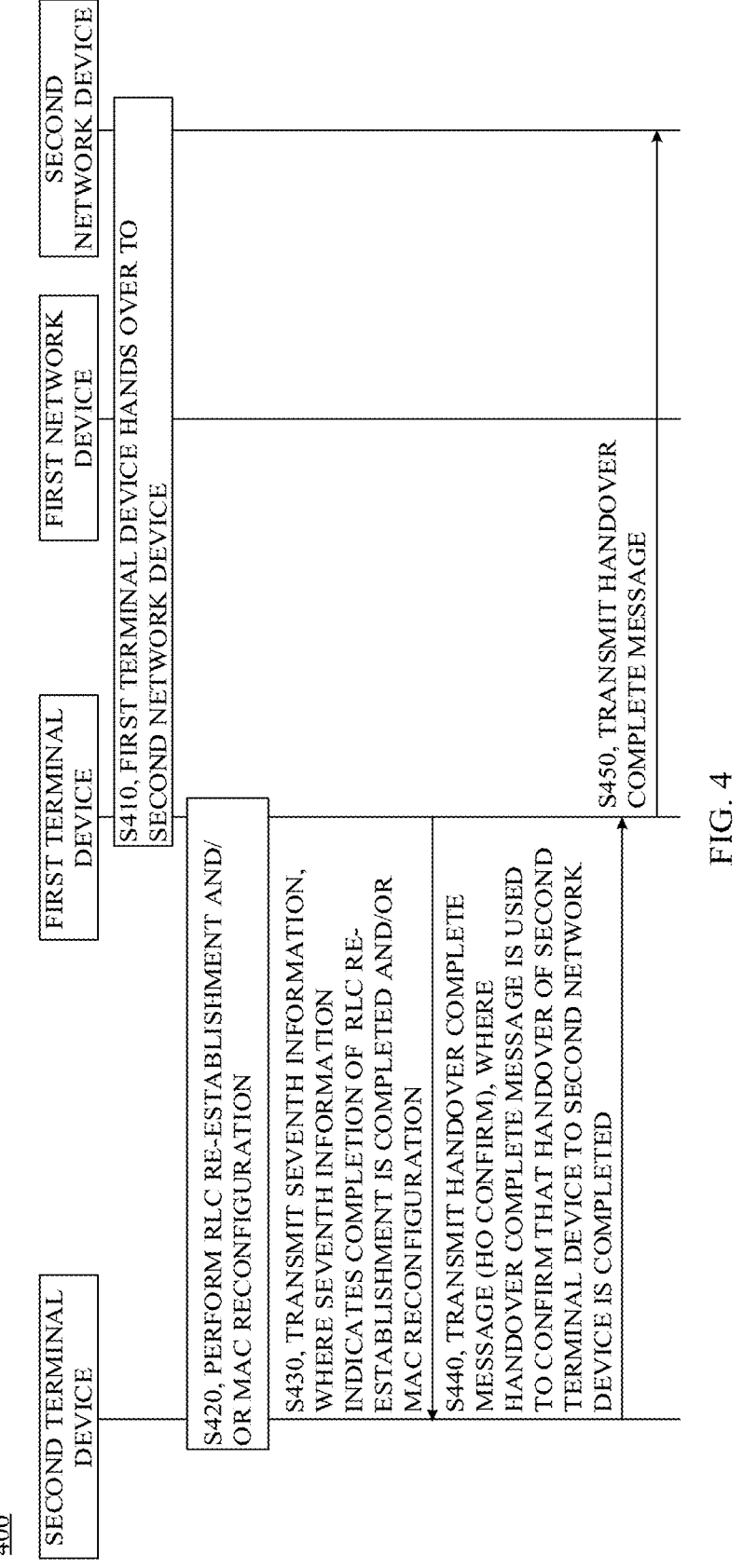
FIG. 4 is another schematic flowchart of a communication method provided in implementations of the disclosure.

FIG. 4 is a schematic flowchart of another communication method 400 provided in implementations of the disclosure.

In an implementation, it may be specified in a protocol that a relay terminal device (that is, the first terminal device) performs RLC re-establishment and/or MAC reconfiguration with a remote terminal device (that is, the second terminal device) upon reception of the first information. Or it may be specified in a protocol that the remote terminal device performs RLC re-establishment and/or MAC reconfiguration with the relay terminal device upon reception of the second information.

In another implementation, the first information further indicates that the first terminal device performs RLC re-establishment and/or MAC reconfiguration with the second terminal device, or the second information further indicates that the second terminal device performs RLC re-establishment and/or MAC reconfiguration with the first terminal device.

For example, manner 1 and manner 2 above are possible manners in which the second terminal device hands over to the second network device via the first terminal device. Which manner to adopt may be determined by the first network device and/or the first terminal device according to a condition of the second terminal device. If determined by the first network device, the manner of handover will be notified by the first network device to the first terminal device through the first information or notified by the first network device to the second terminal device through the second information. If determined by the first terminal device, the manner of handover will be notified by the first terminal device to the second terminal device through the second information. The disclosure is not limited in this regard.

S410, the first terminal device hands over from the first network device to the second network device.

The first network device acts as a source network device for the first terminal device. The first terminal device hands over from the first network device to the second network device acting as a target network device.

For example, the first terminal device initiates a random access procedure to access the second network device, for instance, transmits a random access preamble sequence on a RACH of the second network device to access the second network device. Once the second network device has notified corresponding network configuration to the first terminal device through an RRC message, the first terminal device transmits a handover confirmation (HO-confirm) message to the second network device, thereby completing handover of the first terminal device to the second network device. The disclosure is not limited in this regard.

S420, the first terminal device and the second terminal device perform RLC re-establishment and/or MAC reconfiguration.

Once handover of the first terminal device to the second network device is completed, the first terminal device can interact with the second network device to complete related configuration for the first terminal device to provide relay service to the second terminal device (for example, user-plane configuration for the second terminal device, etc., but the disclosure is not limited thereto). As such, the first terminal device can perform RLC re-establishment and/or MAC reconfiguration (MAC reset) with the second terminal device based on the related configuration for relay service.

S430, the first terminal device transmits seventh information to the second terminal device, where the seventh information indicates handover complete of the first terminal device to the second network device.

Accordingly, the second terminal device receives the seventh information from the first terminal device.

Upon reception of the seventh information, the second terminal device can determine that handover of the first terminal device to the second network device is completed, and thus determine that the RLC re-establishment is completed and/or the MAC reconfiguration is completed, and the second terminal device can continue communicating with a network through relay service provided by the first terminal device.

Optionally, if the seventh information is received by the second terminal device within a second time-interval after the second information is received, the second terminal device determines that handover to the second network device succeeds. Or if the seventh information is not received by the second terminal device within the second time-interval after the second information is received, the second terminal device determines that handover to the second network device fails. Optionally, the second time-interval may be specified in a protocol or configured by a network.

Optionally, the second terminal device starts a second timer (or may be other devices capable of timing such as a counter, a timer, etc.) upon reception of the second information, where a timing duration of the second timer is the second time-interval.

If the seventh information is received by the second terminal device before the second timer expires, the second terminal device determines that handover to the second network device succeeds, and stops the second timer. Or if the second timer expires, the second terminal device determines that handover to the second network device fails, that is, the second terminal device determines that handover to the second network device fails if the seventh information is not received before the second timer expires.

Once the second terminal device determines that handover to the second network device fails, the second terminal device can trigger a connection re-establishment procedure, for example, transmit a connection re-establishment message to the first terminal device. Or the second terminal device can search, through a cell search procedure, for a cell capable of serving the second terminal device, and access a network through a random access procedure. Or the second terminal device can search for another terminal device capable of providing relay communication service, and establish a sidelink connection with the terminal device to communicate with a network via the terminal device. The disclosure is not limited in this regard. According to the scheme above, a period in which the second terminal device hands over to the second network device via the first terminal device is restricted by the second time-interval, which can avoid a case where the second terminal device is unable to communicate due to failure of handover to the second network device via the first terminal device for a long time.

Optionally, S440, the second terminal device transmits a handover complete message (HO confirm) to the first terminal device, where the handover complete message is used to confirm that handover of the second terminal device to the second network device is completed.

Accordingly, the first terminal device receives the handover complete message of the second terminal device.

After the connection with the first terminal device is re-established, the second terminal device can notify, via the first terminal device, the second network device that handover is completed, such that the second terminal device and the second network device can reach an agreement, thereby performing subsequent communication.

Optionally, S450, the first terminal device transmits the handover complete message to the second network device.

Accordingly, the second network device receives the handover complete message from the first terminal device.

In an implementation, after the handover complete message from the second terminal device is received by the first terminal device in S440, the first terminal device forwards the handover complete message to the second network device, such that the second terminal device and the second network device can reach an agreement in order for subsequent communication.

In another implementation, the second terminal device transmits ACK information after the seventh information is received from the first terminal device. The first terminal device can determine, according to the ACK information, that handover of the second terminal device to the second network device is completed, and notify the second network device through the handover complete message.

According to the scheme above, after handover of the first terminal device to the second network device is completed, the first terminal device performs RLC re-establishment and/or MAC reconfiguration with the second terminal device according to configuration of the second network device, thereby realizing handover of the second terminal device to the second network device via the first terminal device. As such, in case of handover of a relay terminal device, a remote terminal device can hand over to the same network device via the relay terminal device, which is possible to prevent the remote terminal device from searching for another device capable of providing service due to handover of the relay terminal device, thereby reducing power consumption of the remote terminal device and avoiding unnecessary resource waste.

It is to be noted that, in implementations illustrated in FIG. 2, FIG. 3, and FIG. 4, all or some of the steps may be selected and implemented, or the order of the steps illustrated in the drawings may be adjusted. The execution order of the steps illustrated in the drawings can be determined by the logical relationship between the steps. It should be understood that, the sequential number of each step shall not constitute limitation on the execution order. Execution of some of the steps illustrated in the drawings or adjustment of the order of the steps shall fall within the protection scope of the disclosure.

The method provided in implementations of the disclosure has been elaborated above with reference to FIG. 2 to FIG. 4. The following will elaborate an apparatus provided in implementations of the disclosure with reference to FIG. 5 to FIG. 7.

Figure 5:
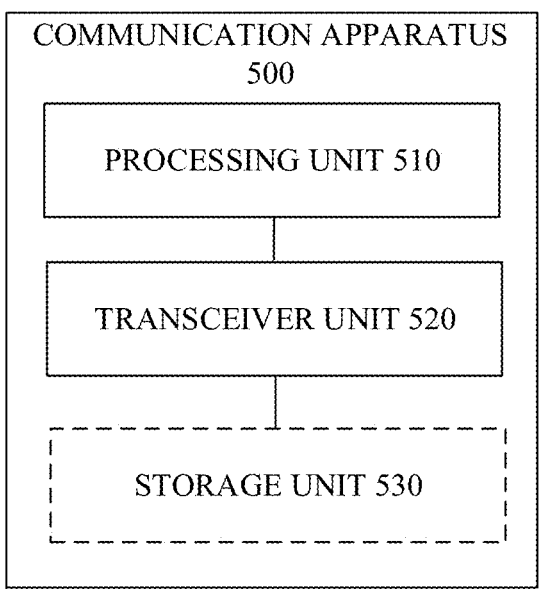
FIG. 5 is a schematic block diagram illustrating an example of a communication apparatus according to the disclosure.

FIG. 5 is a schematic block diagram of a communication apparatus provided in implementations of the disclosure. As illustrated in FIG. 5, the communication apparatus 500 may include a processing unit 510 and a transceiver unit 520.

In a possible design, the communication apparatus 500 may correspond to the terminal device (such as the first terminal device or the second terminal device) in the foregoing method implementations, or may be a chip configured (or used) in the terminal device (such as the first terminal device or the second terminal device).

It should be understood that, the communication apparatus 500 may correspond to the first terminal device or the second terminal device in the methods 200, 300, and 400 according to implementations of the disclosure. The communication apparatus 500 may include units for the first terminal device or the second terminal device to implement the method in the methods 200, 300, and 400 illustrated in FIG. 2, FIG. 3, and FIG. 4. In addition, the above and other operations and/or functions of various units of the communication apparatus 500 are respectively intended for implementing corresponding operations in the methods 200, 300, and 400 illustrated in FIG. 2, FIG. 3, and FIG. 4.

It should be further understood that, if the communication apparatus 500 is a chip configured (or used) in the terminal device, the transceiver unit 520 in the communication apparatus 500 may be an input/output interface or circuit in the chip, and the processing unit 510 in the communication apparatus 500 may be a processor in the chip.

Optionally, the communication apparatus 500 may further include the processing unit 510. The processing unit 510 can be configured to process instructions or data to implement corresponding operations.

Optionally, the communication apparatus 500 may further include a storage unit 530, where the storage unit 530 can be configured to store instructions or data. The processing unit 510 can execute the instructions or data stored in the storage unit, such that the communication apparatus can perform corresponding operations. The transceiver unit 520 in the communication apparatus 500 may correspond to a transceiver 610 in a terminal device 600 illustrated in FIG. 6, and the storage unit 530 may correspond to a memory in the terminal device 600 illustrated in FIG. 6.

It should be understood that, the specific process of performing the corresponding operations by various units has been elaborated in the foregoing method implementations, which will not be described in detail again herein for the sake of simplicity.

Figure 6:
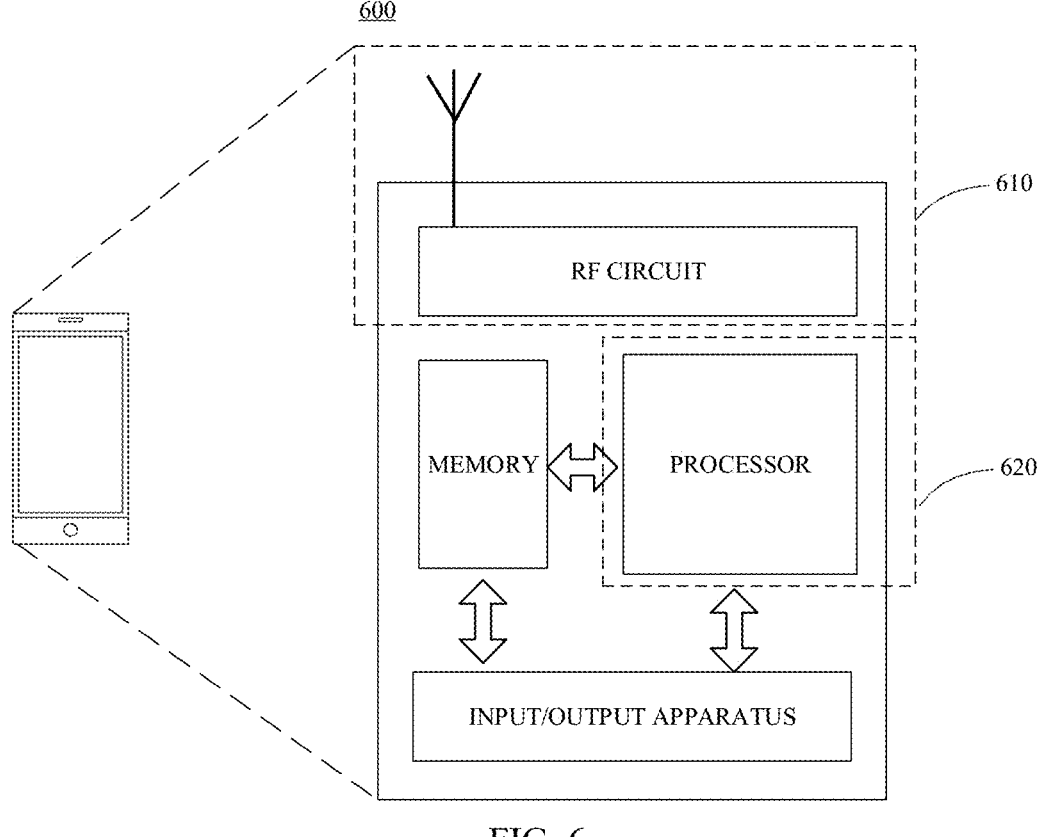
FIG. 6 is a schematic structural diagram illustrating an example of a terminal device according to the disclosure.

It should be further understood that, if the communication apparatus 500 is a terminal device, the transceiver unit 520 in the communication apparatus 500 may be implemented by a communication interface (such as a transceiver or an input/output interface), for example, may correspond to the transceiver 610 in the terminal device 600 illustrated in FIG. 6; and the processing unit 510 in the communication apparatus 500 may be implemented by at least one processor, for example, may correspond to a processor 620 in the terminal device 600 illustrated in FIG. 6. The processing unit 510 in the communication apparatus 500 may be implemented by at least one logic circuit.

In another possible design, the communication apparatus 500 may correspond to the network device (such as the first network device or the second network device) in the foregoing method implementations, or may be a chip configured (or used) in the network device (such as the first network device or the second network device).

It should be understood that, the communication apparatus 500 may correspond to the first network device or the second network device in the methods 200, 300, and 400 according to implementations of the disclosure. The communication apparatus 500 may include units for the first network device to implement the method or units for the second network device to implement the method in the methods 200, 300, and 400 illustrated in FIG. 2, FIG. 3, and FIG. 4.

In addition, the above and other operations and/or functions of various units of the communication apparatus 500 are respectively intended for implementing corresponding operations in the methods 200, 300, and 400 illustrated in FIG. 2, FIG. 3, and FIG. 4.

It should be further understood that, if the communication apparatus 500 is a chip configured (or used) in the network device, the transceiver unit in the communication apparatus 500 may be an input/output interface or circuit in the chip, and the processing unit 510 in the communication apparatus 500 may be a processor in the chip.

Optionally, the communication apparatus 500 may further include the processing unit 510. The processing unit 510 can be configured to process instructions or data to implement corresponding operations.

Optionally, the communication apparatus 500 may further include a storage unit 530, where the storage unit can be configured to store instructions or data. The processing unit can execute the instructions or data stored in the storage unit 530, such that the communication apparatus can perform corresponding operations. The storage unit 530 in the communication apparatus 500 may correspond to a memory of a network device 700 illustrated in FIG. 7.

It should be understood that, the specific process of performing the corresponding operations by various units has been elaborated in the foregoing method implementations, which will not be described in detail again herein for the sake of simplicity.

Figure 7:
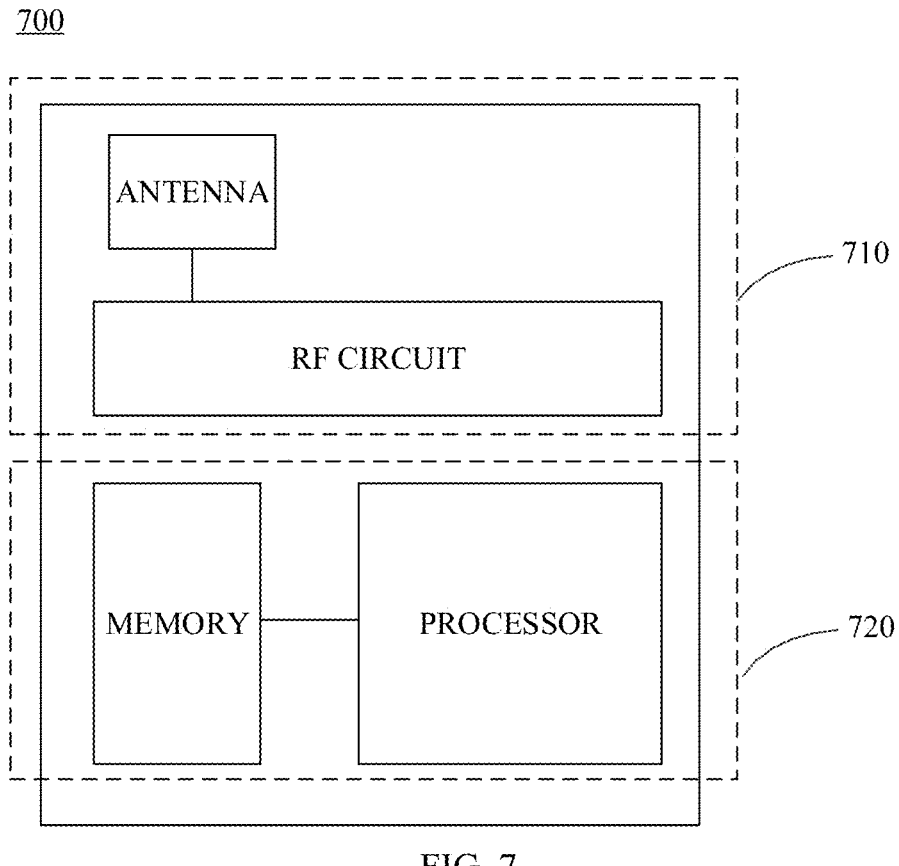
FIG. 7 is a schematic structural diagram illustrating an example of a network device according to the disclosure.

It should be further understood that, if the communication apparatus 500 is a network device, the transceiver unit 520 in the communication apparatus 500 may be implemented by a communication interface (such as a transceiver or an input/output interface), for example, may correspond to a transceiver 710 in the network device 700 illustrated in FIG. 7; and the processing unit 510 in the communication apparatus 500 may be implemented by at least one processor, for example, may correspond to a processor 720 in the network device 700 illustrated in FIG. 7. The processing unit 510 in the communication apparatus 500 may be implemented by at least one logic circuit.

FIG. 6 is a schematic structural diagram of a terminal device 600 provided in implementations of the disclosure. The terminal device 600 is applicable to the system illustrated in FIG. 1, and can implement functions of the terminal device in the foregoing method implementations. As illustrated in FIG. 6, the terminal device 600 includes a processor 620 and a transceiver 610. Optionally, the terminal device 600 further includes a memory. The processor 620, the transceiver 610, and the memory can communicate with each other through an internal connection path to transfer control signals and/or data signals. The memory is configured to store computer programs. The processor 620 is configured to execute the computer programs in the memory, to control the transceiver 610 to transmit and receive signals.

The processor 620 and the memory may be integrated into one processing apparatus. The processor 620 is configured to execute program codes stored in the memory to implement the above functions. In actual implementation, the memory may also be integrated into the processor 620 or independent of the processor 620. The processor 620 may correspond to the processing unit in FIG. 5.

The transceiver 610 may correspond to the transceiver unit in FIG. 5. The transceiver 610 may include a receiver (or referred to as a receiver circuit) and a transmitter (or referred to as a transmitter circuit). The receiver is configured for signal reception, and the transmitter is configured for signal transmission.

It should be understood that, the terminal device 600 illustrated in FIG. 6 can implement various operations of the terminal device in the methods 200, 300, and 400 illustrated in FIG. 2, FIG. 3, and FIG. 4. The operations and/or functions of various modules of the terminal device 600 are respectively intended for implementing corresponding operations in the foregoing method implementations. For details thereof, reference can be made to elaborations in the foregoing method implementations, and some detailed elaborations will be omitted herein to avoid repetition.

The processor 620 can be configured to perform operations implemented internally by the terminal device described in the foregoing method implementations, while the transceiver 610 can be configured to perform operations of transmission to the network device or reception from the network device by the terminal device in the foregoing method implementations. For details thereof, reference can be made to elaborations in the foregoing method implementations, which will not be repeated herein.

Optionally, the terminal device 600 may further include a power supply. The power supply is configured to power various devices or circuits in the terminal device.

Besides, in order to make functions of the terminal device 600 more comprehensive, the terminal device 600 may further include one or more of an input unit, a display unit, an audio circuit, a camera, a sensor, etc. The audio circuit may further include a speaker, a microphone, etc.

FIG. 7 is a schematic structural diagram of a network device provided in implementations of the disclosure. The network device 700 is applicable to the system illustrated in FIG. 1, and can implement functions of the network device in the foregoing method implementations. FIG. 7 may be, for example, a schematic diagram illustrating the related structure of the network device.

It should be understood that, the network device 700 illustrated in FIG. 7 can implement various operations of the network device in the methods 200, 300, and 400 illustrated in FIG. 2, FIG. 3, and FIG. 4. The operations and/or functions of various modules of the network device 700 are respectively intended for implementing corresponding operations in the foregoing method implementations. For details thereof, reference can be made to elaborations in the foregoing method implementations, and some detailed elaborations will be omitted herein to avoid repetition.

It should be understood that, the network device 700 illustrated in FIG. 7 is merely a possible architecture of the network device, and shall not constitute any limitation on the disclosure. The method provided in the disclosure is applicable to network devices of other architectures, such as a network device including a centralized unit (CU), a distributed unit (DU), and an active antenna unit (AAU), etc. There is no limitation on the specific architecture of the network device in the disclosure.

Implementations of the disclosure further provide a processing apparatus. The processing apparatus includes a processor and an interface. The processor is configured to perform the method in any of the foregoing method implementations.

It should be understood that, the processing apparatus may be one or more chips. For example, the processing apparatus may be a field programmable gate array (FPGA), an application specific integrated circuit (ASIC), a system on chip (SoC), a central processor unit (CPU), a network processor (NP), a digital signal processor (DSP), a micro controller unit (MCU), a programmable logic device (PLD), or other integrated chips.

During implementation, each step of the foregoing methods may be completed by an integrated logic circuit of hardware in the processor or an instruction in the form of software. The steps of the method disclosed in implementations of the disclosure may be directly implemented by a hardware processor, or may be performed by hardware and software modules in the processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof, which will not be described in detail again herein to avoid repetition.

It should be noted that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a DSP, an ASIC, an FPGA, or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory of the systems and methods described in the disclosure is intended to include, but is not limited to, these and any other suitable types of memory.

Based on the method provided in implementations of the disclosure, a computer program product is further provided in the disclosure. The computer program product includes computer program codes which, when executed by one or more processors, can cause an apparatus equipped with the processor to perform the method in the foregoing implementations.

Based on the method provided in implementations of the disclosure, a computer-readable storage medium is further provided in the disclosure. The computer-readable storage medium is configured to store program codes which, when executed by one or more processors, can cause an apparatus equipped with the processor to perform the method in the foregoing implementations.

Based on the method provided in implementations of the disclosure, a system is further provided in the disclosure. The system includes one or more network devices described above. The system may further include one or more terminal devices described above.

It will be appreciated that the devices and methods disclosed in implementations of the disclosure may also be implemented in various other manners. For example, the above apparatus implementations are merely illustrative, e.g., the division of modules is only a division of logical functions, and other manners of division may be available in practice, e.g., multiple modules may be combined or may be integrated into another system, or some features may be ignored or skipped. In other respects, the coupling or direct coupling or communication connection as illustrated or discussed may be an indirect coupling or communication connection through some interface or module, and may be electrical, mechanical, or otherwise.

It should be understood that, in actual implementation of the terminal device and the network device described above, the processor may be a CPU, or may be other general purpose processors, a DSP, an ASIC, etc. The general purpose processor may be a microprocessor, or the processor may be any conventional processor or the like. The steps of the method disclosed in the disclosure may be directly implemented by a hardware processor, or may be performed by hardware and software modules in the processor.

All or some steps for implementing various method implementations above may be completed by related hardware of program instructions. The programs may be stored in a readable memory. The programs, when executed, perform steps in various method implementations above. The memory includes a ROM, a RAM, a flash memory, a hard disk, a solid-state disk, a magnetic tape, a floppy disk, an optical disc, and any combination thereof.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A communication method, comprising:
determining, by a first terminal device, according to first information, to transmit second information to a second terminal device, wherein the first information is received from a first network device, and the first information indicates that the first terminal device is to hand over to the second network device;
transmitting, by the first terminal device, the second information to the second terminal device, the second information indicating that the second terminal device is to hand over to a second network device, and the first terminal device providing relay service to the second terminal device; and
transmitting, by the first terminal device, third information to the second terminal device, wherein the third information indicates that a communication connection between the first terminal device and the second terminal device is to be disconnected.

2. The method of claim 1, further comprising:
receiving, by the first terminal device, the second information from a first network device.

3. The method of claim 1, wherein the first information further indicates that the first terminal device disconnects the communication connection with the second terminal device.

4. The method of claim 1, further comprising:
transmitting, by the first terminal device, information to the second terminal device, wherein the information indicates to the second network device handover complete of the first terminal device.

5. The method of claim 1, further comprising:
receiving, by the first terminal device, a handover complete message from the second terminal device, wherein the handover complete message is used to confirm that handover of the second terminal device to the second network device is completed; and
transmitting, by the first terminal device, the handover complete message to the second network device.

6. A communication method, comprising:
receiving, by a second terminal device, second information from a first terminal device, the second information indicating that the second terminal device to hand over to a second network device, and the first terminal device providing relay service to the second terminal device, wherein the second information is determined to be transmitted to the second terminal device by the first terminal device according to first information, wherein the first information is received from a first network device by the first terminal device, and the first information indicates that the first terminal device is to hand over to the second network device; and
receiving, by the second terminal device, third information from the first terminal device, wherein the third information indicates that a communication connection between the first terminal device and the second terminal device is to be disconnected.

7. The method of claim 6, further comprising:
transmitting, by the second terminal device, fourth information to the first terminal device, wherein the fourth information indicates that a communication connection between the first terminal device and the second terminal device is to be disconnected.

8. The method of claim 7, wherein the second information further indicates that the second terminal device disconnects the communication connection between the first terminal device and the second terminal device.

9. The method of claim 6, further comprising:

starting, by the second terminal device, a first timer after the second information is received, wherein a timing duration of the first timer is a first time-interval.

10. The method of claim 9, further comprising:

determining, by the second terminal device, that handover of the second terminal device to the second network device fails, when the first timer expires.

11. A terminal device configured to perform the method of claim 6.

12. A terminal device, comprising:

a transceiver;

a processor; and a memory storing computer programs which, when executed by the processor, are operable with the processor to:

determine, according to first information received by the transceiver, to transmit second information to a second terminal device, wherein the first information is received from a first network device, and the first information indicates that the first terminal device is to hand over to the second network device;

cause the transceiver to transmit second information to a second terminal device, the second information indicating that the second terminal device is to hand over to a second network device, and the first terminal device providing relay service to the second terminal device;

cause the transceiver to transmit third information to the second terminal device, wherein the third information indicates that a communication connection between the first terminal device and the second terminal device is to be disconnected.

13. The terminal device of claim 12, wherein the transceiver is further configured to:

receive the second information from a first network device.

14. The terminal device of claim 12, wherein the first information further indicates that the first terminal device disconnects the communication connection with the second terminal device.

15. The terminal device of claim 12, wherein the transceiver is further configured to:

transmit information to the second terminal device, wherein the information indicates to the second network device handover complete of the first terminal device.

16. The terminal device of claim 12, wherein the transceiver is further configured to:

receive a handover complete message from the second terminal device, wherein the handover complete message is used to confirm that handover of the second terminal device to the second network device is completed; and transmit the handover complete message to the second network device.

* * * * *